Nov. 3, 1931.  D. L. HUNTER  1,830,276
CONDUIT COUPLING
Filed June 11, 1928  2 Sheets-Sheet 1

Inventor
Daniel L. Hunter
By J. Vincent Martin
Attorney

Nov. 3, 1931.  D. L. HUNTER  1,830,276
CONDUIT COUPLING
Filed June 11, 1928   2 Sheets-Sheet 2

Inventor
Daniel L. Hunter
By J. Vincent Martin
Attorney

Patented Nov. 3, 1931

1,830,276

UNITED STATES PATENT OFFICE

DANIEL L. HUNTER, OF HOUSTON, TEXAS, ASSIGNOR TO HUNTER-WALKER COMPANY, OF HOUSTON, TEXAS, A CORPORATION OF TEXAS

CONDUIT COUPLING

Application filed June 11, 1928. Serial No. 284,288.

This invention relates to couplings for flexible metallic conduits and has for its general object the provision of certain new and useful improvements on the coupling described in my pending application for Letters Patent of the United States, filed on the 20th day of March, 1928, Serial No. 263,078.

Junction and outlet boxes, and so-called "condulets" and the like are provided with openings of standard diameters for the reception of conduit couplings or connectors of certain sizes. It is frequently desirable to connect a small conduit to a box having an opening of a relatively great diameter, and the small couplings adapted to hold the conduit are not adapted for attachment in the opening. This invention has for one of its specific objects to provide new and improved means whereby a coupling may be attached in an opening regardless of the relatively great diameter of the latter.

Another specific object of the invention is to provide a coupling having a new and improved sleeve adjustably mounted thereon and adapted to cover and hold the end of the conduit in which the coupling is inserted, said sleeve being removable so that the coupling may be screwed out of the conduit or passed through openings of a relatively small diameter.

Figure 1:
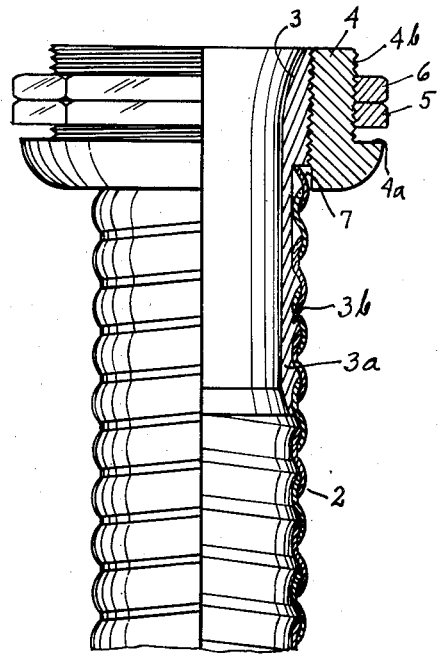
Figure 2:
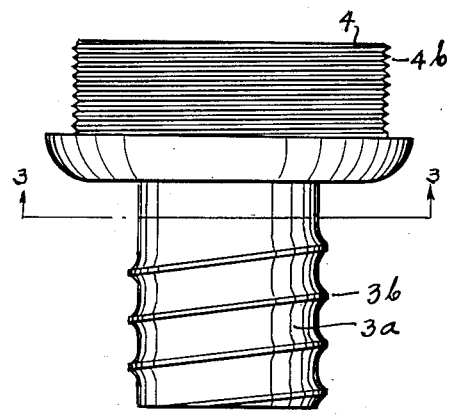
Figure 3:
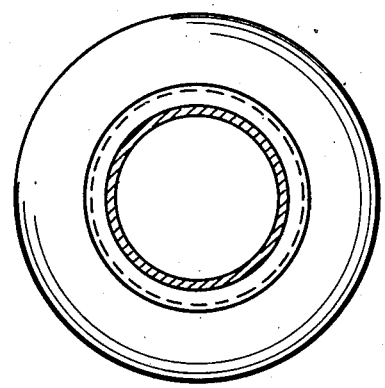
Figure 4:
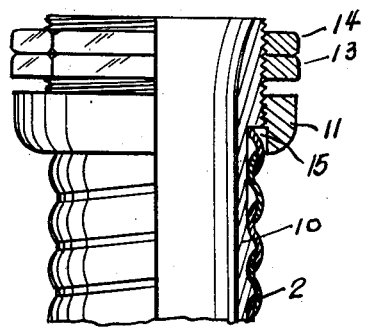
Figure 5:
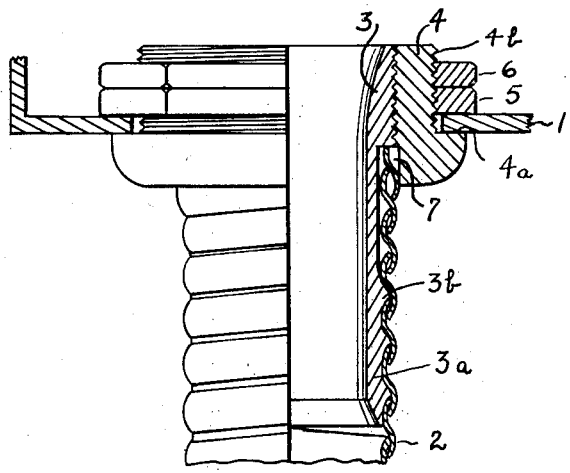

In the accompanying drawings, Fig. 1 is a partly sectional side elevation of the coupling partly screwed into a flexible conduit and having an adaptor sleeve thereon; Fig. 2, a side elevation of the coupling shown by Fig. 1; Fig. 3, a horizontal section on the line 3—3 of Fig. 2; Fig. 4, a partly sectional elevation of the coupling partly screwed into a flexible conduit and having a sleeve of normal size thereon; Fig. 5, a partly sectional side elevation of the coupling locked in the conduit and connecting the same to a box having a relatively large opening; and Fig. 6, a partly sectional side elevation of the coupling locked in a conduit and connecting the same to a box having an opening of normal size.

At the outset, I wish it to be understood that the device provided by my invention may be used to connect flexible conduits to elements other than boxes and the like, which will be apparent to those skilled in the art.

Referring to Figs. 1, 2, 3 and 5 of the drawings, the box and the conduit are shown fragmentarily at 1 and 2, respectively. The coupling is indicated at 3. The opening in the box 1 is adapted for the reception of a coupling much larger than the coupling 3.

Threaded upon the coupling 3 is an adaptor sleeve 4 of a size to fit the opening in the box 1 and having a shoulder 4a engaging the outer side of the box adjacent its hole, and external threads 4b adapted to be engaged by suitable nuts 5 and 6, whereby the coupling 3 is securely held in said opening.

The coupling 3 has a reduced end 3a adapted to be inserted in the flexible metallic conduit 2 and having threads 3b adapted to fit the internal groove of said conduit. The said conduit is of a type now in common use and comprises a spirally wound band, as shown. The upper end of the conduit extends into the annular chamber 7 formed by the end 3a of the coupling 3, and the sleeve 4.

The sleeve 4 may be removed from the coupling 3 to permit the passage of the coupling through openings of relatively small diameters; and to release the end of the conduit for a purpose hereinafter referred to.

The nut 5 within the box 1 may be held stationary and a wrench or the like easily applied to that part of sleeve 4 outside of said box to so rotate said sleeve that the box is locked between the shoulder 4a and the nut 5; or the sleeve 4 may be moved outwardly out of engagement with the nut 5.

The coupling 3 and the sleeve 4 may be easily and cheaply manufactured, and may be made in many sizes to effect connection between a box or the like having an opening of a certain diameter and conduits of various sizes.

Various changes in the preferred embodiment above described may be made without departure from the scope of the hereinafter appearing claims.

Figure 6:
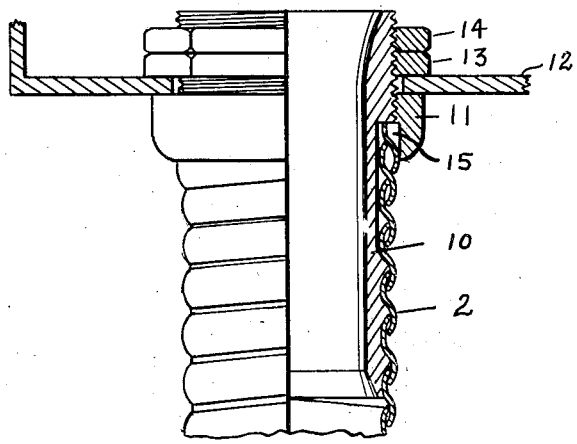

In Figs. 4 and 6 the coupling is indicated at 10 and the sleeve at 11, the annular chamber formed thereby at 15, the box at 12 and the nuts at 13 and 14. In this form of the invention the coupling 3 has no reduced ends, and the sleeve 11 no external shoulder.

It will be obvious that the chambers 7 and 15 open outwardly to receive and retain the end of a conduit. The engagement of the end of a conduit with the walls of the chamber in the form shown by Figs. 1 and 5 will be understood in view of the following description of the engagement in the form shown by Figs. 4 and 6.

The conduit 2, comprises a spirally wound metallic band of the cross section shown, adapted to circumferentially expand when longitudinally contracted. Now when the coupling 10 is screwed into the conduit, the end of the conduit will be brought into engagement with the shoulder formed by the reduction of the outer end of the coupling, as shown clearly by Fig. 4. When the coupling is screwed further into the conduit after the forward movement of the end of the conduit has been arrested by the engagement just referred to, the conduit will be longitudinally contracted by its creeping movement inwardly on the coupling so that the end of the conduit will be circumferentially expanded into locking engagement with the side walls of the chamber 15, that is, the opposite walls of the coupling 10 and sleeve 11. This is shown clearly by Fig. 6.

In my pending application hereinabove referred to, the element corresponding to the sleeve 11 of the form now being described is made integral with the coupling and the coupling cannot forcibly be removed from the conduit. It is necessary to cut the conduit off the coupling. In the embodiment shown by the present invention, just described, the coupling may easily be screwed out of the conduit because the sleeve 11 may be removed to permit access to the end of the conduit. Furthermore, the sleeve 11 may be screwed a limited distance toward or away from the wall 12 of the box to lock the coupling thereto, without releasing the conduit, because such longitudinal movement of the sleeve on the coupling does not permit circumferential expansion of the end of the conduit, and the locking engagement of the parts is, therefore, not disturbed.

I claim:

1. The combination with a conduit comprising a spirally wound band forming an internal groove, of a coupling having threads thereon fitting in said groove, and a sleeve threaded on said coupling for alternate longitudinal movement over and away from said conduit.

2. The combination with a conduit comprising a spirally wound band forming an internal groove, of a coupling comprising a hollow cylindrical body having a reduced end in said conduit, threads on said end and fitting in said groove, and a sleeve threaded on said coupling for alternate movement over and away from said conduit.

3. The combination with a conduit comprising a spirally wound band forming an internal groove, and a box having an opening therein, of a coupling having threads thereon fitting in said groove, and a sleeve threaded on said coupling, covering the end of said conduit, extending into said opening, and having a shoulder thereon to engage the exterior of said box adjacent said opening, and adjustable means on said sleeve to hold said sleeve in said opening.

4. A device of the character described comprising a hollow cylindrical body having conduit threads adjacent its outer end, and a sleeve mounted for outward movement toward the outer end of said body to form therewith an annular chamber adjacent said threads, and for inward movement toward the inner end of said body away from that portion of said body with which it is adapted to form said chamber.

5. A device of the character described comprising a hollow cylindrical body having a reduced outer end, conduit threads on said end, and a sleeve threaded on the inner end of said body for movement toward the outer end of said body to form therewith an annular chamber adjacent said threads, said sleeve being removable inwardly from the inner end of said body.

6. A device of the character described comprising a hollow cylindrical body having conduit threads thereon and a sleeve threaded on said body and having external threads and an annular shoulder adjacent said external threads.

7. A device of the character described comprising a hollow cylindrical body having a reduced end, conduit threads on said end, a sleeve threaded on said body for movement over the inner portion of said end and for movement away from said portion, and having external threads and an annular shoulder adjacent said external threads.

8. A device of the character described comprising a hollow cylindrical body having conduit threads thereon and a sleeve threaded on said body and having external threads, an annular shoulder adjacent said external threads, and a nut on said external threads.

9. A device of the character described comprising a hollow cylindrical body having a reduced end, conduit threads on said end, a sleeve threaded on said body, extending over the inner portion of said end, and having external threads, an annular shoulder adjacent said external threads, and a nut on said external threads.

10. The combination with a flexible metallic conduit comprising a spirally wound band adapted to circumferentially expand when longitudinally contracted, and forming an internal groove, of a coupling having conduit threads thereon fitting in said groove, and a sleeve mounted for longitudinal movement on said coupling to alternately form with said coupling an annular chamber for the reception and retention of the end of said conduit and to expose the end of said conduit, the end portion of said conduit being expanded into locked engagement with the walls of said chamber substantially as set forth.

11. The combination with a flexible metallic conduit comprising a spirally wound band adapted to circumferentially expand when longitudinally contracted, and forming an internal groove, of a coupling having conduit threads thereon fitting in said groove, and a sleeve threaded on said coupling for outward movement to form with said coupling an annular chamber for the reception and retention of the end of said conduit and for inward movement to expose the end of said conduit.

12. The combination with a flexible metallic conduit comprising a spirally wound band adapted to circumferentially expand when longitudinally contracted and forming an internal groove, of a coupling having a reduced outer end, conduit threads on said end and fitting in said groove, and a sleeve mounted for outward longitudinal movement on said coupling over the inner portion of said reduced end to form with said portion an annular chamber for the reception and retention of the end of the conduit, and for inward movement away from said portion.

13. The combination with a flexible metallic conduit comprising a spirally wound band adapted to circumferentially expand when longitudinally contracted and forming an internal groove, of a coupling having a reduced outer end, conduit threads on said end and fitting in said groove, and a sleeve threaded on the inner end of said coupling for longitudinal movement toward the outer end of said coupling over the inner portion of said end to form with said portion an annular chamber for the reception and retention of the end of the conduit, and for inward movement toward the inner end of said body away from said portion.

14. The combination with a flexible metallic conduit comprising a spirally wound band adapted to circumferentially expand when longitudinaly contracted and forming an internal groove, of a coupling having an external thread in said groove, said coupling also having an annular chamber into which the end portion of said conduit extends, said chamber having a bottom wall against which the end of said conduit abuts, whereby said conduit is longitudinally contracted, and side walls with which the end portion of said conduit is in locked engagement upon consequent circumferential expansion of said conduit, the elements providing said side walls being separable to expose the end of said conduit.

15. The combination with a flexible metallic conduit comprising a spirally wound band adapted to circumferentially expand when longitudinally contracted and forming an internal groove, of a coupling body having a reduced outer end, conduit threads on said end and fitting in said groove, said coupling also having a sleeve threaded on the inner end of said body for outward movement to form with said reduced end and the shoulder formed by the reduction of said end an annular chamber into which the end portion of said conduit extends, said conduit being longitudinally contracted by its engagement with said shoulder and circumferentially expanded into locked engagement with said sleeve and the outer end of said body substantially as set forth, said sleeve being movable toward the inner end of said body to expose the end of said conduit.

16. The combination with a conduit comprising a spirally wound band forming an internal groove, of a coupling having threads thereon fitting in said groove, and a sleeve threaded on said coupling for alternate longitudinal movement over and away from said conduit, said sleeve having external threads and an external annular shoulder adjacent said threads.

17. The combination with a conduit comprising a spirally wound band forming an internal groove, of a coupling comprising a hollow cylindrical body having a reduced end in said conduit, threads on said end and fitting in said groove, and a sleeve threaded on said coupling for alternate movement over and away from said conduit, said sleeve having external threads and an external annular shoulder adjacent said threads.

18. The combination with a flexible metallic conduit comprising a spirally wound band adapted to circumferentially expand when longitudinally contracted, and forming an internal groove, of a coupling having conduit threads thereon fitting in said groove, and a sleeve threaded on said coupling for outward movement to form with said coupling an annular chamber for the reception and retention of the end of said conduit and for inward movement to expose the end of said conduit, said sleeve having external threads and an external annular shoulder adjacent said threads.

In testimony whereof, I hereunto affix my signature.

DANIEL L. HUNTER.